(12) United States Patent
Pavan et al.

(10) Patent No.: US 7,713,451 B2
(45) Date of Patent: May 11, 2010

(54) PROCESS FOR MANUFACTURING A WATER-RESISTANT TELECOMMUNICATION CABLE

(75) Inventors: Massimiliano Pavan, Milan (IT); Stefano Testi, Milan (IT); Raffaella Donetti, Milan (IT); Cristiano Puppi, Milan (IT); Mauro Maritano, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 616 days.

(21) Appl. No.: 10/577,350

(22) PCT Filed: Oct. 29, 2003

(86) PCT No.: PCT/EP03/11995

§ 371 (c)(1),
(2), (4) Date: Mar. 1, 2007

(87) PCT Pub. No.: WO2005/049303

PCT Pub. Date: Jun. 2, 2005

(65) Prior Publication Data

US 2007/0246848 A1    Oct. 25, 2007

(51) Int. Cl.
B29C 47/10    (2006.01)
B29D 11/00    (2006.01)

(52) U.S. Cl. .............. 264/1.28; 264/1.29; 264/142; 264/211; 264/211.23

(58) Field of Classification Search .............. 264/211, 264/1.28, 1.29; 523/348
See application file for complete search history.

(56) References Cited

U.S. PATENT DOCUMENTS 3,863,066 A    1/1975    Liedholz
(Continued)

FOREIGN PATENT DOCUMENTS

EP    0 354 410 A2    2/1990
(Continued)

OTHER PUBLICATIONS

Cattaneo; "Poly (Vinyl Alcohol) Molding Powders"; Abstract of JP-580830430 A2, XP-002067930, May 18, 1983.
(Continued)

Primary Examiner—Yogendra N Gupta
Assistant Examiner—Daniel Lee
(74) Attorney, Agent, or Firm—Finnegan, Henderson, Farabow, Garrett & Dunner, L.L.P.

(57) ABSTRACT

A process for manufacturing a water-resistant telecommunication cable. The cable has a solid and compact element having a water-soluble polymer material having vinyl alcohol/vinyl acetate copolymer having a hydrolysis degree of 60-95% and a polymerisation degree higher than 1,800 and at least one solid low-melting and one solid high melting plasticizers. The process produces continuously the water-soluble polymer material by separately feeding, in sequence, a multi-screw extruder, in the flow direction, with the copolymer and the high melting plasticizer melting and mixing them while transporting them through the extruder, and with the low melting plasticizer, melting and mixing them with the copolymer and the high melting plasticizer, subsequently homogenizing the copolymer and the plasticizers and finally discharging the melt, at a temperature lower than or equal to 205° C. A process for extruding the above PVA based water-soluble polymer material. The process allows extrusion of PVA with an enhanced productivity and reproducibility requiring shorter times for absorbing the plasticizers onto the polymer.

49 Claims, 2 Drawing Sheets

U.S. PATENT DOCUMENTS

| | | | |
|---|---|---|---|
| 4,323,492 A | | 4/1982 | Zimmermann et al. |
| 4,469,837 A | | 9/1984 | Cattaneo |
| 4,493,807 A | * | 1/1985 | Vyvial et al. ............... 264/101 |
| 4,542,178 A | | 9/1985 | Zimmermann et al. |
| 5,051,222 A | * | 9/1991 | Marten et al. ............... 264/143 |
| 5,462,981 A | * | 10/1995 | Bastioli et al. ................ 524/47 |
| 5,948,848 A | | 9/1999 | Giltsoff |
| 6,103,823 A | * | 8/2000 | Centofanti et al. ............ 525/60 |
| 6,228,495 B1 | * | 5/2001 | Lupia et al. .................. 428/379 |
| 6,426,026 B1 | * | 7/2002 | Avgousti et al. ............ 264/143 |
| 7,155,094 B2 | * | 12/2006 | Donetti et al. .............. 385/102 |
| 2002/0041744 A1 | * | 4/2002 | Anelli et al. ................ 385/112 |
| 2003/0036721 A1 | | 2/2003 | Zhao et al. |
| 2005/0175834 A1 | * | 8/2005 | Maritano et al. ............ 428/364 |

FOREIGN PATENT DOCUMENTS

| | | |
|---|---|---|
| EP | 0 635 545 A2 | 1/1995 |
| EP | 0 794 215 A1 | 9/1997 |
| EP | 0 860 471 A1 | 8/1998 |
| EP | 0 860 471 B1 | 8/1998 |
| GB | 1410744 | 10/1975 |
| JP | 50031890 | 3/1975 |
| JP | 2002254492 | 9/2002 |
| WO | WO-93/09171 | 5/1993 |
| WO | WO-00/21098 | 4/2000 |
| WO | WO-03/051595 A1 | 6/2003 |
| WO | WO-03/056576 A1 | 7/2003 |
| WO | WO-2004/059360 A1 | 7/2004 |

OTHER PUBLICATIONS

Yang et al., Method for Continuous Preparation of Polyvinyl Alcohol Uniform Spinning Solution; Abstract of CN-1358886, Jul. 17, 2002.
STN Chemical Abstracts, vol. 2, No. 100, Jan. 9, 1984, "Poly(vinyl alcohol) Molding Powders", Abstract of JP58083040 A2, XP002067930.

* cited by examiner

PROCESS FOR MANUFACTURING A WATER-RESISTANT TELECOMMUNICATION CABLE

CROSS REFERENCE TO RELATED APPLICATION

This application is a national phase application based on PCT/EP2003/011995, filed Oct. 29, 2003, the content of which is incorporated herein by reference.

BACKGROUND OF THE INVENTION

1. Field of the Invention

The present invention relates to a process for manufacturing a water-resistant telecommunication cable, in particular an optical fibre cable, comprising a solid and compact element, specifically a buffer tube, housing a loose transmitting element, wherein the solid and compact element comprises a water-soluble polymer material produced in continuous.

2. Description of the Related Art

The solid and compact element of the cable comprises a water-soluble polymer material, comprising a vinyl alcohol/vinyl acetate (referred to hereinbelow as VA-VAc copolymer and generally identified in the art as PVA), suitable to maintain loose the transmitting element upon the extrusion of the cable.

The use of water-expanding thermoplastic materials, such as those comprising PVA, allows to produce water-resistant telecommunication cables, in particular optical fibre cables comprising buffer tubes housing loose transmitting elements.

Several problems have been generally encountered processing PVA. It is known that the melting point of PVA is close to its decomposition temperature and that the risk of cross-linking is high. The extrudability of PVA has hitherto been sought to be improved, e.g., by the addition of plasticizers, commonly a polyhydric alcohol, and lubricants such as stearic acid, the result being however of limited utility because the use of PVA requires to work within a very narrow temperature range. Also the fugitive nature of plasticizers could generate a tendency to stick, thereby interfering with a smooth extrusion. The kind and amount of the plasticizers are also important to get a composition neither too tacky in use and nor too soft for the manufacturing process.

Further, PVA is mainly prepared by batch processes, basically comprising at least a pre-dispersion phase wherein the various components are mixed—in a determined sequence—in a thermostatic mixer, in order to absorb the plasticizers on PVA; subsequently extruding the resulting mixture to melt it and finally homogenize it.

U.S. Pat. No. 4,469,837 describes a process substantially based on the dry mixing of PVA powders with 15-50% of plasticizers based on polyhydroxylated solid alcohols having a melting point from 160° C. to 230° C., with the possible addition of poor percentages of other alcohols or liquid hydroxylated products, and on the subsequent extrusion and/or hot moulding of the resulting mixtures.

U.S. Pat. No. 6,103,823 discloses a three stage process for the preparation of mouldable and extrudable PVA based solid compositions comprising feeding a mixer in succession with a) PVA and 1-10 wt % of at least one solid plasticizer such as glycols, polyethylene glycols and aliphatic amides; b) 5-30 wt % of a liquid mixture containing one or more hydroxylated organic compounds, water and at least a salt of an alkaline and/or alkaline earth metal; c) 15-30 wt % of a solid mixture containing solid polyhydroxylated alcohols, glycols and glycolic esters, liquid alkanolamines, mineral or organic acids, a compound selected from hydrated inorganic salts and aluminum trihydroxide heptahydrate, stabilizers and possible mineral charges. The resulting composition is then transformed by the commonly used equipments for the production of granulates, flat or tubular films, moulded articles of manufacture, plates or films co-extruded with polymers.

Also known are processes for extruding continuously PVA.

U.S. Pat. No. 4,323,492 and U.S. Pat. No. 4,542,178 disclose a tack-free granular PVA thermoplastically processable composition and a process—possibly carried out continuously—for the manufacture thereof. The composition comprises PVA granules having a diameter of from 0.4 to 4 mm, 5-50 wt % of a plasticizer, f.i. glycerol, polyethylene glycol, trimethylol propane, an amount of water insufficient to dissolve the PVA granules, and 2-12 wt % of a fine particle high molecular weight organic compound, f.i. starch, cellulose, casein, amounts being referred to the unplasticized PVA granules.

U.S. Pat. No. 5,051,222 discloses a method for readily melt extruding a clear, essentially gel-free, thermally stable PVA composition including adding energy to both melt it and essentially eliminate the crystallinity in the melt and simultaneously removing energy from the melt to avoid the PVA decomposition. The addition of energy has to be sufficient to melt the polymer in the first zone of the extruder, thereafter lowering the energy in order to avoid degradation during the extrusion and mixing steps. Rather than performing a pre-mixing step, it is more preferred to directly inject the plasticizer (glycerol), mineral acid and dispersing agent into the extruder downstream from the first zones used for feeding and heating up the PVA which is then quickly melted, sheared and extruded, avoiding a prolonged exposure to high heat in a pre-mixer. The preferred temperature profile of the PVA obtained in the different extruder zones is 150°-230° C., most preferably 170°-220° C., depending upon the grade of PVA. Temperatures lower than these result in the appearance of unmelted particles in the strands from the extruder outlet, while temperatures above this range increase the number of gels in the strand and promote degradation of the polymer at the barrel walls.

JP 50031890 discloses a continuous process for de-aerated, aqueous concentrated PVA solutions carried out in a multi-screw extruder, wherein a 100:120:10 mixture of PVA:water:glycerol is fed to the extruder, temperature being strictly controlled to 96-104° C. depending on the different extruder chambers.

JP 2002254492 discloses a process for extruding powdered PVA by supplying it to a twin-screw extruder, consisting of a screw element and a kneading disk, under rotation of the screw; supplying solvents to the extruder to dissolve PVA; removing air and volatiles from a vent port of the extruder; supplying plasticizers to the extruder; and homogenizing the resulting mixture (100:100:20 of PVA:water:glycerin)—showing neither bubbles nor lumps—and extruding it.

CN 1358886 discloses a process for preparing uniform spinning PVA solutions wherein PVA is suspended in DMSO and then continuously and quantitatively fed to a twin-screw extruder at normal pressure and low temperature, dissolving, vacuum-defoaming and metering to output, preventing PVA from thermal oxidation degradation.

U.S. Pat. No. 4,493,807 discloses a process for extruding an optically clear, high-grade sheet-like structure, from a vinyl alcohol polymer, wherein, in a self-cleaning multi-screw extruder, the polymer is mixed with a small amount of water, at 20-100° C., the mixture is homogenized and melted, at 80-200° C., the melt being de-volatilised to remove undesirable volatile constituents, and finally extruded, conventionally shaping the extrudate into the sheet-like structure. Plasticizers, f.i. glycerol, and/or lubricants may be optionally mixed into the vinyl alcohol polymer and are preferably added between the feed point of the polymer and the melting and homogenisation zone.

SUMMARY OF THE INVENTION

The Applicant realized that the batch processes known for extruding PVA show a reduced productivity and reproducibility, the loss of productivity deriving mainly from the long time necessary to obtain a dry pre-mixture of the components. In fact, in order to obtain a dry and homogeneous pre-mixture, the plasticizers must be added to PVA in small portions both to allow the absorption into the polymer and to avoid the mixture collapse. A wet mixture would indeed involve its difficult dosing into the extruder whereas, should the plasticizers be not well absorbed, hardly a homogeneous melt would be extruded.

Further, the mechanical stirring of the mixture, during the pre-mixing step, originates, because of attrition, the rising of temperature which, accordingly, has to be maintained below 100° C. in order to avoid the polymer degradation. Accordingly, it is possible to mix only limited amounts of material, also in the presence of a cooled mixer.

Besides, the plasticizers loss carries to experiencing problems concerning reproducibility; in fact, liquid and/or low-melting plasticizers can volatilise whereas the non-absorbed ones can be lost as either a precipitate, when discharging the mixer, or while transferring the mixture from the mixer to the feeder.

Further, the sequence of the addition of the plasticizers is of remarkable importance too, since wrong sequences bring— once again—to wet the resulting mixture which cannot, therefore, be adequately dosed and fed to the extruder.

Also, the formation of unmelted crystalline areas, which may be observed in the extruded PVA products, adversely affects the homogeneity of the final thermoplastic material.

The Applicant has now found that the above technical problems and drawbacks can be overcome by carrying out a process for manufacturing a water-resistant telecommunication cable, in particular an optical fibre cable, comprising a solid and compact element—wherein the solid and compact element comprises a water-soluble polymer material—the solid and compact element being obtained by sequentially feeding, at peculiar temperatures, a multi-screw extruder with the components of the water-soluble polymer material.

According to a first aspect, the present invention thus relates to a process for manufacturing a water-resistant telecommunication cable comprising a solid and compact element housing at least one transmitting element, wherein the solid and compact element comprises a water-soluble polymer material comprising:
- a vinyl alcohol/vinyl acetate copolymer having a hydrolysis degree of 60-95% and a polymerisation degree higher than 1,800;
- at least a first solid plasticizer, having a melting point of 50-110° C., and a second solid plasticizer, having a melting point equal or higher than 140° C., in an amount of 10-30 and 1-10 parts by weight per hundred parts by weight of the copolymer, respectively;
- the water-soluble polymer material showing:
  - a complex modulus (G*) equal or higher than $2.5 \times 10^6$ MPa;
  - a ratio of the viscous modulus to the elastic modulus (tan δ) equal or lower than 2.30;
  - a glass transition temperature (Tg) of 20-35° C.;

the process comprising producing in continuous the water-soluble polymer material by separately feeding in sequence a multi-screw extruder, in the flow direction, with:
- the copolymer and the second solid plasticizer, melting and mixing them at 170-220° C.;
- the first solid plasticizer, melting and mixing it with the second solid plasticizer and the copolymer at 140-180° C.; subsequently homogenizing the copolymer and the plasticizers at 100-150° C. and finally discharging the melt, at a temperature lower or equal to 205° C.

The temperatures indicated in the present specification as to producing in continuous the water-soluble polymer material according to the process of the invention refer to the temperatures set on the different extruder zones whereas the discharging temperature refers to the temperature of the melt.

For the purposes of the present invention, the expression "solid and compact element" is intended to refer to an element consisting of a material, or a mixture of materials, which, at the working temperatures of the obtained cable (and in the near absence of water), is not fluid, fibrous or pulverulent, and has mechanical properties, such as elastic modulus, breaking load, elongation at break and the like, which are similar to those of conventional polymer materials employed to make the structural elements of the cable, such as, for example, cores, sheaths or tubular elements containing optical fibres. The term "conventional materials" is referred in the present description to those material typically employed in the art for manufacturing the above structural elements and comprise within its meaning, although not being limited to, polymer materials such as polyolefins, for example polyethylene (high, medium and low density PE), polypropylene (PP) or ethylene-propylene copolymers (PEP), polybutylene terephthalate (PBT), polyvinylchloride (PVC) or polyamides (PA).

The solid and compact element comprised in the cable obtained by the process of the invention can comprise more than 75% of the water-soluble polymer material above defined, this meaning that this solid element can be mainly made of such water-soluble polymer material, with the optional addition of other minor components such as, for example, fillers, plasticizers, pigments, dyes, processing agents, biocides or stabilizers, present in an amount of less than 25% by weight, preferably less than 10%.

In the present description, the expressions "water-blocking material" or "water-blocking properties" are intended to refer typically to a material capable of blocking the longitudinal propagation of water inside the cable within a predetermined length of this cable. Preferably, this length is less than or equal to 10 metres.

The expression "water-soluble polymer material" is intended to mean that the water-blocking material used in a cable according to the present invention is capable of at least partially dissolving on contact with water, creating an aqueous solution with a predetermined viscosity value. In particular, the viscosity of the solution which forms upon contact with water will be such that it hinders the flow of said solution in the cable. Preferably, this solution has a viscosity such that it essentially blocks a flow of water which has penetrated into a cavity, within a distance of less than about ten metres from the point of ingress of said water.

For the purpose of the present invention, the term "transmitting element" includes within its meaning any element capable of transmitting a signal, particularly optical fibres, including individual optical fibres, ribbons or bundles of optical fibres, either as such or protected by a polymeric sheath. Non limiting examples of optical fibres are, for example, single-mode fibres, multi-mode fibres, dispersion-shifted (DS) fibres, non-zero dispersion (NZD) fibres, or fibres with a large effective area and the like, depending on the application requirements of the cable. They are generally fibres with an outside diameter of between 230 and 270 μm.

The process of the invention allows, without a pre-dispersion phase, the absorption of the plasticizers on PVA directly within the extruder and in a shorter time than batch processes and allows both the thermal control and the monitoring of the energy transferred to the polymer material which involves reducing, if not eliminating, the polymer degradation.

Besides, the process of the invention allows to adopt a temperature profile, in the different extruder zones, of 100°-220° C. and to avoid the appearance of unmelted particles in the extruded material.

It has to be noted that, after the melting and mixing of the copolymer with the second solid plasticizer which is carried out, as disclosed above, at 170-220° C., the temperature, throughout the remaining extruder zones, is lower than the copolymer melting temperature and yet higher than the temperature of recrystallization thereof, this allowing to shorten the time of the exposition of the copolymer to high temperatures and to reduce the degradation phenomena.

Preferably, the multi-screw extruder provides an energy input of 0.15-0.50 kWh/kg, more preferably of 0.30-0.40 kWh/kg, to the water-soluble polymer material.

Also preferably, the multi-screw extruder has a multi-zone thermally controlled barrel.

The set temperatures of the barrel influence the mechanical energy input: keeping constant the output and screw speed, the lower the temperatures set in the barrel are, the higher the mechanical energy input is.

Preferably, the multi-screw extruder comprises a system for the dissipation of the mechanical energy input which may be, for instance, a water cooling system.

A preferred apparatus used as the compounding extruder is a self-cleaning co-rotating fully intermeshing twin screw extruder. The screw is preferably made by different elements, as it is preferably designed to have conveying and kneading or mixing sections, according to the desired compounding process. For instance, when the extruder has an L/D ratio of 48 (L=screw length; D=screw diameter), the number of the screw elements is preferably about 50-60.

To assemble an appropriate screw, in order to achieve the desired shear in the different sections of the extruder, would be an easy task for the man skilled in the art by applying the common general knowledge of the field.

The barrel of the extruder is a multi-zone one, each different zone, preferably, comprising its own thermal control apparatus, such as, for instance, an electrical system for heating and a water system for cooling.

The compounding extruder is operating at high rpm (revolutions per minute), giving the required energy input to the VA-VAc copolymer.

The process permits, without any preliminary steps such as, f.i., dry blending of the various components, to melt the copolymer and the high melting plasticizer, absorbing the latter and the other plasticizer(s) sequentially inserted thereafter in different zones of the extruder, directly on the melt while homogenising it.

Further, the unmelted crystalline areas—which may be observed in the extruded PVA based products—have been found to be substantially undetectable in the water-soluble polymer material extruded by the process of the invention.

As above illustrated, the process of the invention comprises first melting and mixing PVA with the second solid plasticizer feeding thereafter the first solid plasticizer, and allows to guarantee and/or to maintain the flow rate in the extruder without adversely affecting the quality of the resulting polymer material.

Further, the process of the invention is carried out at temperatures near to the PVA re-crystallization, avoiding its degradation and minimizing the plasticizers loss, inserting any components in the extruder by continuous weight-losing gravimetric feeders (such as, f.i., metering device).

Also, the polymer material used to realize the solid and compact element of the water-resistant telecommunication cable manufactured by the process of the invention shows neither bubbles nor unmelted crystalline areas.

The solid and compact element obtained by the process of the invention comprises, preferably, 30% by weight or more, particularly 50% by weight or more, most preferably 75% by weight or more of the water-soluble polymer material.

The solid and compact element is, preferably, a structural element of the cable and, specifically, a tubular element comprising at least one sheath comprising the water-soluble polymer material.

Preferably, the tubular element obtained by the process of the invention is a single sheath substantially made of the water-soluble polymer material or, alternatively, it can be a double layer sheath, the inner layer being made of the water-soluble polymer material and the outer layer being made of a water-insoluble polymer material.

In another embodiment of the invention, the tubular element is a three-layer sheath, the inner and the outer layers being made of the above defined water-soluble polymer material and the intermediate layer being made of a water-insoluble polymer material.

According to a preferred embodiment, the solid and compact element obtained by the process of the invention is a buffer tube and the transmitting element is an optical fibre.

The vinyl alcohol/vinyl acetate copolymer is, preferably, in an amount of 50-95%, particularly of 60-85% of the total weight of the water-soluble polymer material; the copolymer preferably has a hydrolysis degree of 70-92% and a polymerisation degree of 2,500-3,700, most preferably of 3,000-3,500.

In the present description, the expression "vinyl alcohol/vinyl acetate copolymer" is meant to comprise modified polyvinyl alcohol including, yet not limited to, the following polymers obtained:

a) by partial etherification of a polyvinyl alcohol (for example by epoxidation by introducing groups such as —(CH$_2$CH$_2$—O—)$_n$—H into the PVA homopolymer chain;

b) by partial esterification of alcohol groups (similarly, a suitable polyester homopolymer can be hydrolysed in order to introduce hydroxyl functions therein);

or c) by block copolymerization thus obtaining, for example, poly(vinyl alcohol-co-polyoxyethylene) from vinyl acetate, polyoxymethylene monomethyl ether and using a diisocyanate or a diepoxide as chain extender.

The VA-VAc copolymer is generally obtained by hydrolysis of polyvinylacetate, by which the acetate groups of the polymer are converted to hydroxy groups. More specifically, the reaction is typically an alcoholysis of polyvinylacetate with a metal (typically sodium) hydroxide as catalyst. The VA-VAc copolymer resulting from the alkaline alcoholysis has mainly a block structure, where blocks formed by sequences of vinyl-acetate groups of formula —CH$_2$—CH(OCOCH$_3$)— are alternated to blocks formed by sequences of vinyl-alcohol groups of formula —CH$_2$—CH(OH)—.

For the purposes of the present invention, a VA-VAc copolymer, which can be obtained by partial hydrolysis of the acetate groups of a polyvinyl acetate (PVAC) homopolymer, is particularly preferred.

For the purposes of the present invention, the VA-VAc copolymer suitable for the cable obtained by the process of the invention shows a degree of hydrolysis which is incomplete, so as to ensure good solubility of this copolymer in water, and which is sufficiently high, such that the copolymer hydrophilic properties are sufficient to ensure an adequate degree of interaction with water.

The VA-VAC copolymer described in the international patent application WO 03/056576 is suitable for the purposes of the present invention; accordingly, as far as such VA-VAc copolymer is concerned, said application is herein incorporated as a reference.

Examples of commercially available VA-VAc copolymers showing the desired properties are those sold under the trade name Mowiol® (Kuraray), Gohsenol® (Nippon Gohsei), Elvanol® (Du Pont).

Preferably, the first and the second solid plasticizers are in an amount of 12-25 and 3-7 parts by weight per hundred parts by weight of the copolymer, respectively.

The preferred plasticizers for realising the cable by the process of the invention are polyhydric alcohols; particularly, the first solid plasticizer is selected from sorbitol, trimethylolpropane, di-trimethylolpropane, methylpropyl propanediol, and mixtures thereof whereas the second solid plasticizer is selected from mannitol, pentaerythritol, dipentaerythritol; trimethylolethane, and mixtures thereof.

More preferably, the first solid plasticizer is trimethylolpropane or di-trimethylolpropane and the second solid is pentaerythritol or dipentaerythritol; in particular, the first and the second solid plasticizer are in an amount of 20 and 5 parts by weight per hundred parts by weight of said copolymer, respectively.

According to a further preferred embodiment, the process of the invention comprises adding to the above defined water-soluble polymer material a third plasticizer, liquid at room temperature, in an amount of 0.5-10 parts by weight per hundred parts by weight of the copolymer, the third plasticizer being fed, in the process of the invention, after the copolymer and the second solid plasticizer, at 170-220° C.

According to a preferred embodiment, the third plasticizer is fed before the first solid plasticizer.

The third plasticizer is, preferably, a polyhydric alcohol; the preferred third plasticizer being selected from glycerol, ethylene glycol, diethylene glycol, triethylene glycol, propylene glycol, dipropylene glycol, tripropylene glycol, trimethylolpropane ethoxylates, pentaerythritol ethoxylates, and mixtures thereof.

Preferably, the third plasticizer is in an amount of 2-7, particularly 5, parts by weight per hundred parts by weight of said copolymer. The most preferred third plasticizer is diethylene glycol or triethylene glycol.

The Applicant has also found that the VA-VAc copolymer comprised in the solid and compact element of the cable obtained by the process of the invention can be protected against the ageing effects caused by hydrolysis phenomena, by adding an effective amount of a hydrolysis stabilizer compound.

In fact, according to another preferred embodiment, the above defined polymer material further comprises a hydrolysis stabilizer compound comprising a chelant group comprising two hydrogen atoms bonded to two respective heteroatoms selected from nitrogen, oxygen and sulphur, said two hydrogen atoms having a distance between each other of from $4.2 \times 10^{-10}$ m to $5.8 \times 10^{-10}$ m, preferably of from $4.5 \times 10^{-10}$ m to $5.5 \times 10^{-10}$ m, said stabilizer compound being present in an amount of at least 0.75 mmoles per 100 g of the VA-VAc copolymer, the stabilizer being preferably fed together with the copolymer and the second solid plasticizer.

The hydrolysis stabilizer described in the international patent application WO 03/056576 is suitable for the purposes of the present invention; accordingly, as far as such stabilizer is concerned, said application is herein incorporated as a reference; the most preferred stabilizer is N,N'-hexane-1,6-diylbis(3-(3,5-di-ter-butyl-4-hydroxy-phenylpropionamide)).

The presence of the stabilizer allows to reduce the increase of the hydrolysis degree of the VA-VAc copolymer upon ageing, thus maintaining the desired water-blocking properties of the VA-VAc copolymer.

The viscoelastic properties of the above defined water-soluble polymer material were measured by oscillatory techniques, applying a stress or strain thereto and working in the so-called "region of linear strain response".

The water-soluble polymer material was characterised by measuring the phase lag between the applied shear stress and measured shear strain and deriving which component is dominant.

Hooke's law correlates the strain to the stress via a material constant: the modulus; in the oscillation tests, the stress and strain are constantly changing and any number of instantaneous values can be used to obtain the instantaneous value of the viscoelastic or complex modulus G* according to the following formula:

$$G^* = G' + iG''$$

wherein

G' is the elastic modulus, a measure of the elastic storage of energy since the strain is recoverable in an elastic solid, also known as the storage modulus;

G" is the viscous modulus, a measure of the dissipation of energy through permanent deformation in flow, also known as the loss modulus; and i is the imaginary unit of complex numbers.

G' and G" are also related to the phase angle (delta) by the following formula:

$$\tan \delta = G''/G'$$

wherein G' and G" are as above defined.

The Applicant observed that there is an excellent correlation between the complex modulus G*, measured at a frequency of 100 Hz and at a temperature of 200° C., and the extrudability properties of the water-soluble polymer material above defined in terms of dimensional stability and regularity.

The extrudability properties of the material, in terms of dimensional stability and regularity, were found and considered to be acceptable when G* is equal or higher than $2.5 \times 10^6$ MPa, preferably between $3.0 \times 10^6$ and $4.0 \times 10^6$ MPa; the rheological test method was considered to be predictive of said properties because when G* is lower than $2.5 \times 10^6$ MPa, the material molten shape does not show the consistency needed to guarantee said properties for the solid and compact element of the cable obtained by the process of the invention.

The Applicant further noted that tan δ well describes the stickiness effects observed during the extrusion test.

Stickiness is due to the material being more viscous and wetting the surface of the other material with which it comes into contact. The degree of stickiness can be expressed by the ratio of G" to G', determined by an oscillation frequency sweep test at $10^{-2}$ Hz.

The stickiness properties between the melt shape of the solid and compact element and the transmission element of the cable obtained by the process of the invention were found and considered to be acceptable when tan δ is equal or lower than 2.3, preferably between 0.5 and 2.0. Higher values of tans would imply the stickiness of the water-soluble polymer material and result in potentially damages of the transmission element. At the same time, the desired and needed stability and regularity of the water-soluble polymer material upon extrusion would not be guaranteed, this potentially giving rise to attenuation phenomena of the transmitted signal, on account of either irregularly distributed pressures on the surface of the transmission element or excessive ringing of the transmission element, both of which being drawbacks which can result in attenuation phenomena of the transmitted signal, even under conditions which would otherwise not be harmful to the functioning of the cable.

The Applicant used the glass transition temperature Tg, measured according to Differential Scanning Calorimetry (DSC), to evaluate the interaction between the VA-VAc copolymer and the plasticizers.

The Tg of the water-soluble polymer material of the cable obtained by the process of the invention was found and considered to be acceptable when close to room temperature, specifically in the range of 20+-35° C., preferably of 25°-30° C., because the material has to be neither soft nor brittle in order to be easily handled during the different steps of the making of the cable obtained by the process of the invention.

In fact, if Tg is lower than about 20° C., the material results too soft and, due to the water absorbed by the cable produced with such a material upon ageing, its surface becomes sticky. If, on the other hand, Tg is higher than about 35° C., the material results too brittle, which may cause microfractures damaging the transmitting element of the cable possibly produced with such material.

The manufacturing of the cable obtained by the process of the invention, preferably of the so-called tubular element type, in particular of the loose tube type, and specifically of the various cable elements mentioned above, made of or comprising the water-soluble polymer material above defined, can be carried out according to the known techniques, yet preferably as disclosed and more completely described in the international patent application PCT/EP02/14773 which is herein incorporated as a reference as far as the manufacture of the cable and, specifically, any characteristics of the cable here undisclosed are concerned whereas the water-soluble polymer material comprised in the cable obtained by the process of the invention is more completely described in the international patent application WO 03/056576 herein incorporated as a reference as far as such material is concerned.

The multi-screw extruder for carrying out the process of the invention is preferably a self-cleaning fully intermeshing co-rotating twin screw extruder, a Buss kneader, a Ring extruder RE or a Farrell FCM extruder.

According to preferred embodiments, the melting and mixing of the copolymer and the second solid plasticizer are carried out at 180-210° C. whereas the melting and mixing of the first plasticizer with the copolymer and the second solid plasticizer are carried out at 150-170° C.

Also preferred is either carrying out the subsequent homogenization of the copolymer with the plasticizers at 110-140° C. or the discharging of the melt at a temperature lower or equal to 195° C.

At the end of the multi-screw extruder, a pressure build-up system is preferably used to push the material through a die head provided after the system. This system can be, for instance, a tight pitch conveying section in the multi-screw extruder, a gear pump or a single screw extruder flanged or in cascade to the multi-screw extruder. After the die head, a cutting device can be used to make pellets suitable for further extrusion process. This cutting device is preferably a dry air cutting system or a strand pelletizing system with fast centrifuge water separation.

It is evident that, without going beyond the scope of the invention, suitable modifications known in the art can be made to the water-soluble polymer material obtained by carrying out the process of the invention; in particular, it can also be advantageously used for manufacturing mixed energy/telecommunication cables or cables for data transmission different from optical fibre cables too.

According to another aspect, the invention also concerns a process for extruding a water-soluble polymer material comprising:
   a vinyl alcohol/vinyl acetate copolymer having a hydrolysis degree of 60-95% and a polymerisation degree higher than 1,800;
   at least a first solid plasticizer, having a melting point of 50-110° C., and a second solid plasticizer, having a melting point equal or higher than 140° C., in an amount of 10-30 and 1-10 parts by weight per hundred parts by weight of the copolymer, respectively;
   the water-soluble polymer material showing:
   a complex modulus (G*) equal or higher than $2.5 \times 10^6$ MPa;
   a ratio of the viscous modulus to the elastic modulus (tan δ) equal or lower than 2.30;
   a glass transition temperature (Tg) of 20-35° C.;
   the process comprising producing in continuous the water-soluble polymer material by separately feeding in sequence a multi-screw extruder, in the flow direction, with:
   the copolymer and the second solid plasticizer, melting and mixing them at 170-220° C.;
   the first solid plasticizer, melting and mixing it with the second solid plasticizer and the copolymer at 140-180° C.; subsequently homogenizing the copolymer and the plasticizers at 100-150° C. and finally discharging the melt, at a temperature lower or equal to 205° C.

The process for extruding a water-soluble polymer material is preferably carried out as above disclosed as far as any of the ingredients (the copolymer, the plasticizers etc.) and the characteristics (G*, Tg, etc.) of the material are concerned as well as any of the conditions (temperature, extruder, etc.) of the process are concerned too.

BRIEF DESCRIPTION OF THE DRAWINGS

A better understanding of the present invention will result from the following detailed description with reference to the attached figures wherein.

DETAILED DESCRIPTION OF THE INVENTION

Figure 1:
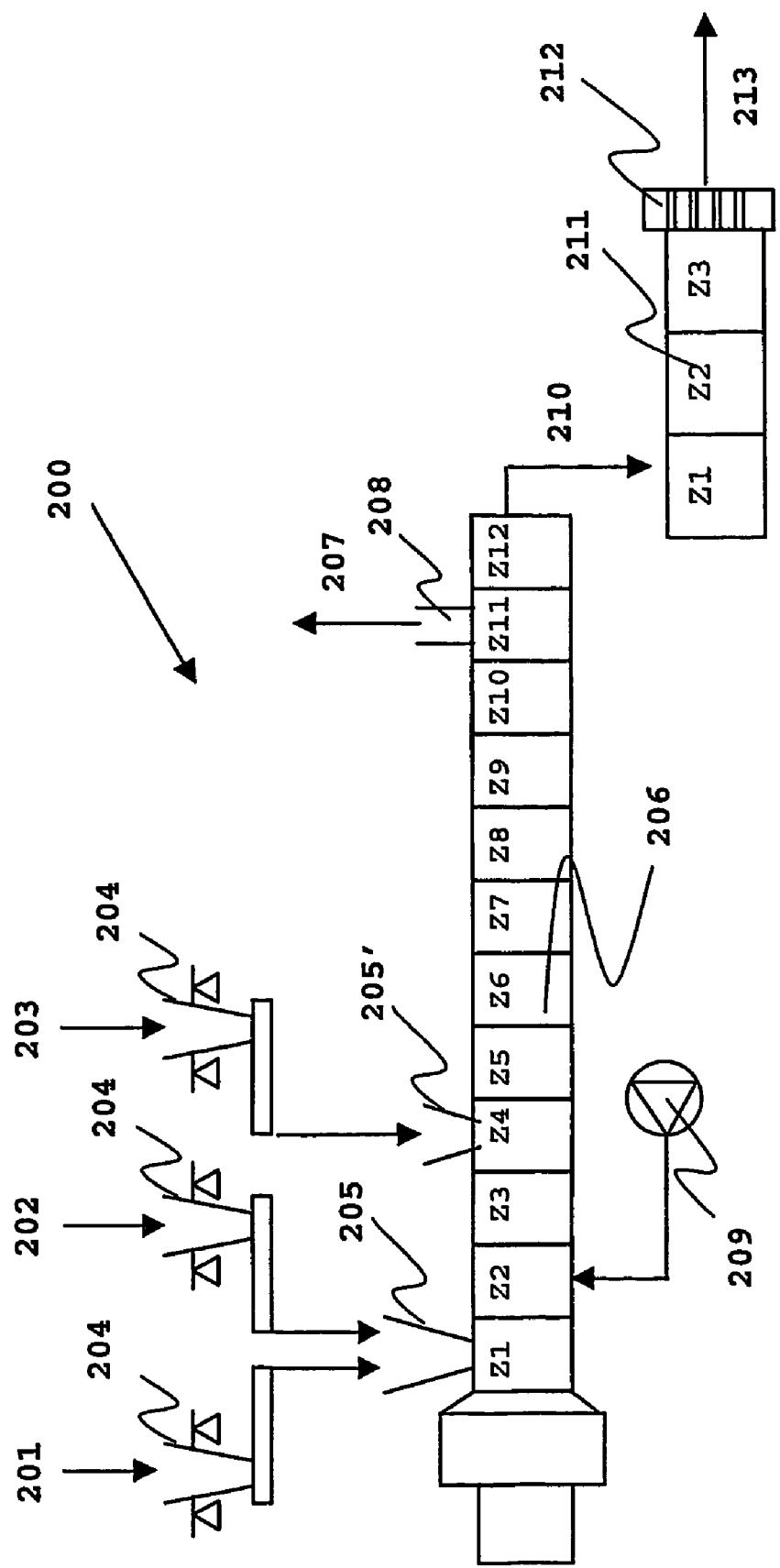
FIG. 1 is a schematic diagram of a production plant for carrying out the process of the invention.

With reference to FIG. 1, the continuous production plant (200) includes an extruder (206) suitable for carrying out the process of the invention. As schematically shown in FIG. 1, by means of two feed hoppers (205, 205') the extruder (206) is fed with the ingredients necessary for producing the composition useful for the production of the solid and compact element of the cable. Preferably, the extruder is a co-rotating twin screw extruder.

Generally, the ingredients are fed separately to the extruder. Each feed hopper (205, 205') may comprise more than one ingredient: for example, the VA-VAc copolymer is fed to the extruder (206) through the first feed hopper (205) together with the second solid plasticizer while the first solid plasticizer is fed to the extruder (206) through the second feed hopper (205'). The third plasticizer optionally present, is injected to the extruder (206) by means of the pump (209): preferably, the injection is carried out before the feeding of the first solid plasticizer.

Each flow (201), (202) and (203) is fed to the feed hoppers (205, 205') by means of a metering device (204). Preferably, said metering device is a loss-in-weight gravimetric feeder.

For simplicity, FIG. 1 shows only one metering device (204) for each flow (201), (202) and (203). However, in case each flow comprises more than one ingredient, preferably each ingredient is provided with a dedicated metering device. Alternatively, a plurality of different ingredients may be metered by means of the same metering device.

FIG. 1 shows also a degassing unit schematically indicated by reference sign (208) from which a flow of the gases possibly generated during extrusion (207) exits.

The resulting polymer material (210) is directly fed to a single screw extruder (211). The composition is subsequently discharged from said extruder (211), e.g. in the form of a subdivided product (213) by pumping it through an extruder die (212) which may be provided with a perforated die plate equipped with knives (not represented in FIG. 1). A gear pump (not represented in FIG. 1) may be provided before said extruder die (212). Alternatively, the resulting polymer material may be obtained in the form of continuous strands which may be then granulated by means of a grinding device (not represented in FIG. 1).

Figure 2:
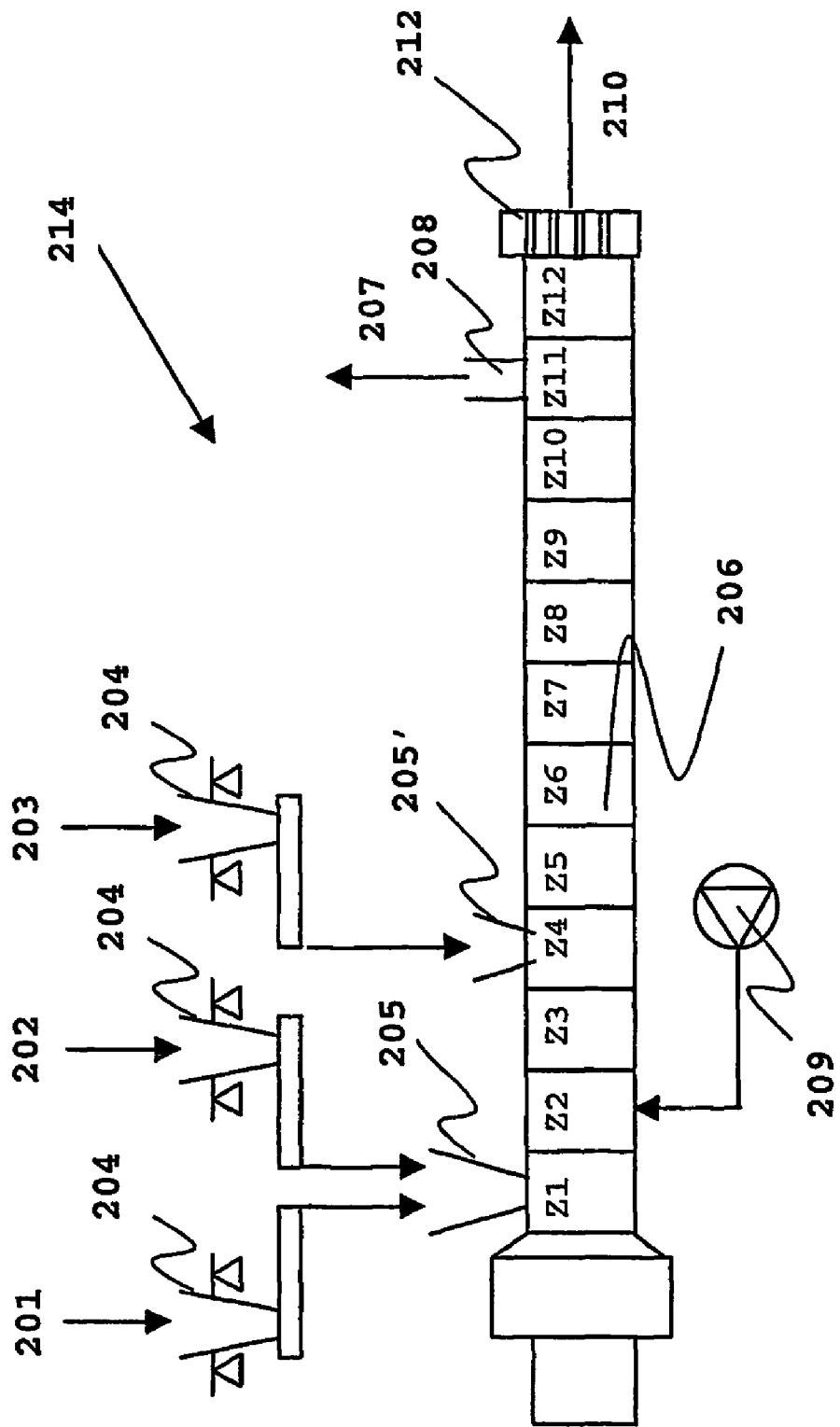
FIG. 2 is a schematic diagram of a further embodiment of a production plant for carrying out the process of the invention.

FIG. 2 is a further embodiment of a continuous production plant (214) for carrying out the process of the invention. In this case, the resulting polymer material (210) is directly discharged from the extruder (206), e.g. in the form of a subdivided product (210) by pumping it through an extruder die (212) which may be provided with a perforated die plate equipped with knives (not represented in FIG. 2). A gear pump (not represented in FIG. 2) may be provided before said extruder die (212). Alternatively, the resulting polymer material may be obtained in the form of a continuous ribbon which may be then granulated by means of a grinding device (not represented in FIG. 1).

The following examples illustrate the invention without limiting it.

EXAMPLE 1

Comparative

In a production plant as illustrated in FIG. 1, Mowiol® 26/88, a VA-VAc copolymer commercialised by Kuraray, having a polymerization degree of 3,300, 1 phr of N,N'-hexane-1,6-diylbis(3-(3,5-di-ter-butyl-4-hydroxyphenylpropionamide)), 15 phr of trimethylolpropane (TMP) and 5 phr of pentaerythritol (PENTA) were fed altogether, using continuous loss-in-weight feeders, to a co-rotating twin-screw extruder Maris TM40HT, having a nominal screw diameter D=40 mm and an L/D ratio of 48, through the first feed hopper (205).

5 phr of diethylene glycol (DEG) were injected to the twin screw extruder through the pump (209) in the chamber Z2.

The resulting polymer material was directly fed to a single screw extruder and subsequently extruded in the form of pellets.

A single screw extruder Maris M100, having a diameter D=100 mm and an L/D ratio of 9 was used.

The working conditions are illustrated in the following tables 1a, 1b and 2.

TABLE 1a

| twin screw temperature profile | | | | | | | | | | | | |
|---|---|---|---|---|---|---|---|---|---|---|---|---|
| | Z1 | Z2 | Z3 | Z4 | Z5 | Z6 | Z7 | Z8 | Z9 | Z10 | Z11 | Z12 |
| T(° C.) | 30 | 180 | 210 | 180 | 160 | 160 | 140 | 130 | 120 | 115 | 110 | 110 |

TABLE 1b

| single screw temperature profile: | | | | |
|---|---|---|---|---|
| | Z1 | Z2 | Z3 | Die |
| T(° C.) | 50 | 180 | 180 | 190 |

TABLE 2

| set extrusion parameters | | |
|---|---|---|
| Flow rate | kg/h | 50 |
| Screw speed (twin screw) | rpm | 230-240 |
| Screw speed (single screw) | rpm | 30 |

Table 3 reports the processing parameters.

TABLE 3

| Power (twin screw) | kW | 18 |
|---|---|---|
| Couple (twin screw) | % | 83% |
| Specific Energy (twin screw) | KWh/kg | 0, 36 |
| Pressure (single screw) | bar | 60-70 |
| Melt temperature(twin screw) | ° C. | 193-196 |

EXAMPLE 2

Comparative

The example was carried out according to what illustrated in the Example 1; yet, Mowiol® 26/88 and 1 phr of N,N'-hexane-1,6-diylbis(3-(3,5-di-ter-butyl-4-hydroxyphenylpropionamide)) were fed to the twin screw extruder through the first feed hopper (205) whereas 15 phr of TMP and 5 phr of PENTA were fed to the twin screw extruder through the second feed hopper (205').

5 phr of DEG were injected to the twin screw extruder through the pump (209) before the feeding (205') of TMP and PENTA.

EXAMPLE 3

The example was carried out according to what illustrated in the Example 1; yet, Mowiol® 26/88, 1 phr of N,N'-hexane-1,6-diylbis(3-(3,5-di-ter-butyl-4-hydroxyphenylpropionamide)) and 5 phr of PENTA were fed to the twin screw extruder through the first feed hopper (205) whereas 15 phr of TMP were fed to the twin screw extruder through the second feed hopper (205').

5 phr of DEG were injected to the twin screw extruder through the pump (209) before the feeding (205') of TMP.

EXAMPLE 4

Comparative

The example relates to a batchwise process and was carried out according to what illustrated in Example 1 except where noted.

20 kg of Mowiol® 26/88 were inserted in a 50 l mixer, cooled by water, heating by mechanical stirring till 70° C.; 1 kg of DEG was then slowly dropped under stirring, till obtainment of a dry powder followed by the addition of 3 kg of TMP, till a dry powder was obtained once again. 3 kg of PENTA and 0.2 kg of N,N'-hexane-1,6-diylbis(3-(3,5-di-terbutyl-4-hydroxyphenylpro-pionamide)) were finally added so to obtain a dry homogeneous mixture (cycle time=about 45 min).

The resulting dry mixture (about 25 kg) prepared as illustrated above was fed into the twin-screw extruder through the first feed hopper (205).

EXAMPLES 5-6

Comparative

Both examples were carried out according to what illustrated in Example 1 except for the extruder temperature profile which was as reported in Table 4.

The water soluble polymer materials were prepared by feeding the ingredients as described in example 3, modifying the twin screw temperature profile as reported in tab 4.

TABLE 4

| Ex. | Z1 | Z2 | Z3 | Z4 | Z5 | Z6 | Z7 | Z8 | Z9 | Z10 | Z11 | Z12 |
|---|---|---|---|---|---|---|---|---|---|---|---|---|
| 5* | 30 | 180 | 210 | 200 | 200 | 200 | 200 | 200 | 200 | 200 | 200 | 200 |
| 6* | 30 | 180 | 210 | 180 | 140 | 140 | 120 | 110 | 110 | 100 | 100 | 100 |

*comparative

Results

The water-soluble polymer materials of examples 1-6 were characterized by the methods reported below; tables 5 and 6 illustrate the results obtained.

Methods of Characterization:

Glass Transition Temperature (Tg)

The glass transition temperature was measured according to Differential Scanning Calorimetry (DSC).

Operating with a Perkin Elmer DSC, Series 7, a sample of about 20 mg, in a first step, was heated and cooled to erase the thermal history thereof and, in the second step, the Tg was measured at a heating rate of 20° C./min. The obtained results are given in the following tables 5 and 6.

% Weight Loss

The % weight loss was measured by means of Size Exclusion Chromatography (SEC).

The % weight loss was measured according to the formula:

$$\% \, wl = 100 * (A_t - A_e)/A_t$$

where At is the amount of plasticizer added to water-soluble polymer and Ae is the amount of plasticizer present into water-soluble polymer material, determined by SEC.

The measurements were performed by a SEC system composed by a degasator, a Waters HP 510 pump, two columns Ultrahydrogel 120 and 250 (commercialised by Waters), and a Refractive Index (RI) detector Shimadzu RID-6A.

10 ml of a 4% solution of the water-soluble polymer material in distilled water were injected and pumped into the columns which separate the different plasticizers by the elution time. The plasticizers were detected by the RI detector and the amounts were calculated by comparing the peak areas to the calibration curves.

The obtained results are given in the following tables 5 and 6.

Evaluation of bubbles and unmelted crystalline areas A buffer tube having an outside diameter of 2.0 mm and a thickness of about 0.25 mm, containing 12 optical fibres having a diameter of 250 μm, was obtained, by a conventional extrusion line using tubing extrusion tools for every polymer material of examples 1-6.

The obtained buffer tubes were visually evaluated in order to verify the presence of both bubbles and unmelted crystalline areas.

The obtained results are given in the following tables 5 and 6.

TABLE 5

| | pellet | | buffer tube | |
|---|---|---|---|---|
| Test | Tg (° C.) | % Wt loss (SEC) | bubbles | U.C.A. |
| 1* | 40 | 8.5 | high | high |
| 2* | 27 | 7.4 | medium | high |
| 3 | 27 | 5.3 | absent | absent |
| 4* | 33 | 20.7 | absent | absent |

*comparative;
U.C.A.: unmelted crystalline areas.

TABLE 6

| | | pellet | | | buffer tube | |
|---|---|---|---|---|---|---|
| TEST | temperature profile | Melt T (° C.) | Tg (° C.) | % Wt loss (SEC) | Bubbles | U.C.A. |
| 3 | intermediate | <205 | 27 | 5.3 | absent | absent |
| 5* | high | 240 | 31 | 18.3 | high | absent |
| 6* | low | 180 | 25 | 2.6 | absent | high |

*comparative;
U.C.A.: unmelted crystalline areas.

As it can be deduced from Table 5, the process of the invention permits to minimise the weight loss of the components with respect to a batch process.

The separated feeding of components guarantees a good plasticization of the polymer material (Tg comprised between 20 and 35° C.) as well as the absence of bubbles and U.C.A. in the buffer tube.

As it is evident from Table 6, only the temperature profile adopted according to the present invention allows to note a reduction of the weight loss of the components and to avoid bubbles and unmelted crystalline areas.

In conclusion, the process of the invention allows compounding PVA with an enhanced productivity, guaranteeing the reproducibility of the rheological and chemo-physical properties of the resulting polymer material and minimising the weight loss of the components.

The invention claimed is:

1. A process for manufacturing a water-resistant telecommunication cable comprising a solid and compact element housing at least one transmitting element, wherein the solid and compact element comprises a water-soluble polymer material comprising:
    a vinyl alcohol/vinyl acetate copolymer having a hydrolysis degree of 60-95% and a polymerisation degree higher than 1,800;
    at least a first solid plasticizer, having a melting point of 50-100° C., and a second solid plasticizer having a melting point equal to or higher than 140° C., in an amount of 10-30 and 1-10 parts by weight per hundred parts by weight of the copolymer, respectively;
    the water-soluble polymer material having:
    a complex modulus equal to or higher than $2.5 \times 10^6$ MPa;
    a ratio of the viscous modulus to the elastic modulus equal to or lower than 2.30;
    a glass transition temperature of 20-35° C.;
    the process comprising:
    continuously producing the water-soluble polymer material by separately feeding in sequence to a multi-screw extruder, in the flow direction, with the copolymer and the second solid plasticizer;
    melting and mixing the copolymer and the second solid plasticizer at 170-220° C.;
    melting and mixing the first solid plasticizer with the second solid plasticizer and the copolymer at 140-180° C.;
    subsequently homogenizing the copolymer and the plasticizers at 100-150° C.; and
    discharging the melt, at a temperature lower than or equal to 205° C.

2. The process according to claim 1, wherein the solid and compact element comprises 30% by weight or more of the water-soluble polymer material.

3. The process according to claim 1, wherein the solid and compact element comprises 50% by weight or more of the water-soluble polymer material.

4. The process according to claim 1, wherein the solid and compact element comprises 75% by weight or more of the water-soluble polymer material.

5. The process according to claim 1, wherein the solid and compact element is a structural element of the cable.

6. The process according to claim 1, wherein the solid and compact element is a tubular element comprising at least one sheath comprising the water-soluble polymer material.

7. The process according to claim 6, wherein the tubular element is a single sheath substantially made of the water-soluble polymer material.

8. The process according to claim 6, wherein the tubular element is a double layer sheath, the inner layer being made of the water-soluble polymer material and the outer layer being made of a water-insoluble polymer material.

9. The process according to claim 6, wherein the tubular element is a three-layer sheath, the inner and the outer layers being made of the water-soluble polymer material and the intermediate layer being made of a water-insoluble polymer material.

10. The process according to claim 1, wherein the solid and compact element is a buffer tube and the transmitting element is an optical fibre.

11. The process according to claim 1, wherein the copolymer is 50-95% of the total weight of the water-soluble polymer material.

12. The process according to claim 1, wherein the copolymer is 60-85% of the total weight of the water-soluble polymer material.

13. The process according to claim 1, wherein the copolymer has a hydrolysis degree of 70-92% and a polymerisation degree of 2,500-3,700.

14. The process according to claim 13, wherein the copolymer has a polymerisation degree of 3,000-3,500.

15. The process according to claim 1, wherein the first and the second plasticizers comprise 12-25 and 3-7 parts by weight per hundred parts by weight of the copolymer, respectively.

16. The process according to claim 1, wherein the first and second plasticizers are polyhydric alcohols.

17. The process according to claim 1, wherein the first plasticizer is selected from sorbitol, trimethylolpropane, ditrimethyloipropane, methylpropyl propanediol, and mixtures thereof, and the second plasticizer is selected from mannitol, pentaerythritol, dipentaerythritol, trimethylolethane, and mixtures thereof.

18. The process according to claim 1, wherein the first plasticizer is trimethyloipropane or ditrimethylolpropane and the second plasticizer is pentaerythritol or dipentaerythritol.

19. The process according to claim 1, wherein the first and the second plasticizers comprise 20 and 5 parts by weight per hundred parts by weight of said copolymer, respectively.

20. The process according to claim 1, wherein the water-soluble polymer material comprises a third plasticizer, liquid at room temperature, in an amount of 0.5-10 parts by weight per hundred parts by weight of the copolymer, the third plasticizer being fed, after the copolymer and the second plasticizer, at 170-220° C.

21. The process according to claim 20, wherein the third plasticizer is a polyhydric alcohol.

22. The process according to claim 20, wherein the third plasticizer is selected from glycerol, ethylene glycol, diethylene glycol, triethylene glycol, propylene glycol, dipropylene glycol, tripropylene glycol, trimethylolpropane ethoxylates, pentaerythritol exthoxylates, and mixtures thereof.

23. The process according to claim 20, wherein the third plasticizer comprises 2-7 parts by weight per hundred parts by weight of said copolymer.

24. The process according to claim 20, wherein the third plasticizer comprises 5 parts by weight per hundred parts by weight of said copolymer.

25. The process according to claim 20, wherein the third plasticizer is diethylene glycol or triethylene glycol.

26. The process according to claim 20, wherein the third plasticizer is fed before the first solid plasticizer.

27. The process according to claim 1, wherein the complex modulus is $3.0 \times 10^6$ to $4.0 \times 10^6$ MPa.

28. The process according to claim 1, wherein the ratio of the viscous modulus to the elastic modulus is 0.5 to 2.0.

29. The process according to claim 1, wherein the glass transition temperature is 25° C. to 30° C.

30. The process according to claim 1, wherein the melting and mixing of the copolymer and the second solid plasticizer are carried out at 180-210° C.

31. The process according to claim 1, wherein the melting and mixing of the first plasticizer with the copolymer and the second solid plasticizer are carried out at 150-170° C.

32. The process according to claim 1, wherein the homogenization of the copolymer with the plasticizers is carried out at 110-140° C.

33. The process according to claim 1, wherein the discharging of the melt is carried out at a temperature lower than or equal to 195° C.

34. The process according to claim 1, wherein the water-soluble polymer material comprises a hydrolysis stabilizer compound comprising a chelant group comprising two hydrogen atoms bonded to two respective heteroatoms selected from nitrogen, oxygen and sulphur, said two hydrogen atoms having a distance between each of $4.2 \times 10^{-10}$ m to $5.8 \times 10^{-10}$ m, said stabilizer compound being present in an amount of at least 0.75 mmoles per 100 g of the copolymer.

35. The process according to claim 34, wherein the stabilizer is fed together with the copolymer and the second solid plasticizer.

36. The process according to claim 34, wherein the stabilizer is N,N'-hexane-1,6-diylbis (3-(3,5-di-tert-butyl-4-hydroxyphenylpropionamide)).

37. The process according to claim 1, wherein the multi-screw extruder is a self-cleaning co-rotating fully intermeshing twin screw extruder, a Buss kneader, a Ring extruder RE® or a Farrell FCM® extruder.

38. The process according to claim 1, wherein the multi-screw extruder provides an energy input of 0.15-0.50 kWh/kg to the water-soluble polymer material.

39. The process according to claim 1, wherein the multi-screw extruder provides an energy input of 0.30-0.40 kWh/kg to the water-soluble polymer material.

40. The process according to claim 1, wherein the multi-screw extruder has a multi-zone thermally controlled barrel.

41. The process according to claim 1, wherein the multi-screw extruder comprises a thermal control apparatus.

42. The process according to claim 41, wherein the thermal control apparatus comprises an electrical system for heating and a water system for cooling.

43. The process according to claim 1, wherein a pressure build-up system followed by a die head are provided at the end of the multi-screw extruder.

44. The process according to claim 43, wherein the pressure build-up system is a tight pitch conveying section in the multi-screw extruder, a gear pump or a single screw extruder flanged or in cascade to the multi-screw extruder.

45. The process according to claim 43, wherein a cutting device is provided after the die head.

46. The process according to claim 45, wherein the cutting device is a dry air cutting system or a strand pelletizing system with fast centrifuge water separation.

47. A process for extruding a water-soluble polymer material comprising:
a vinyl alcohol/vinyl acetate copolymer having a hydrolysis degree of 60-95% and a polymerisation degree higher than 1,800;
at least a first solid plasticizer, having a melting point of 50-110° C, and a second solid plasticizer, having a melting point equal to or higher than 140° C., in an amount of 10-30 and 1-10 parts by weight per hundred parts by weight of the copolymer, respectively;
the water-soluble polymer material having:
a complex modulus equal to or higher than $2.5 \times 10^6$ MPa;
a ratio of the viscous modulus to the elastic modulus equal to or lower than 2.30;
a glass transition temperature of 20-35° C.;
the process comprising
continuously producing the water-soluble polymer material by separately feeding in sequence a multi-screw extruder, in the flow direction, with the copolymer and the second solid plasticizer;
melting and mixing the copolymer and second solid plasticizer at 170-220° C.;
melting and mixing the first solid plasticizer with the second solid plasticizer and the copolymer at 140-180° C.;
subsequently homogenizing the copolymer and the plasticizers at 100-150° C.; and
discharging the melt at a temperature lower than or equal to 205° C.

48. The process according to claim 47, wherein the water-soluble polymer material comprises a third plasticizer, liquid at room temperature, in an amount of 0.5-10 parts by weight per hundred parts by weight of the copolymer, the third plasticizer being fed, after the copolymer and the second plasticizer, at 170-220° C.

49. The process according to claim 47, wherein the water-soluble polymer material comprises a hydrolysis stabilizer compound comprising a chelant group comprising two hydrogen atoms bonded to two respective heteroatoms selected from nitrogen, oxygen and sulphur, said two hydrogen atoms having a distance between each other of $4.2 \times 10^{-10}$ m to $5.8 \times 10^{-10}$ m, said stabilizer compound being present in an amount of at least 0.75 mmoles per 100 g of the copolymer.

* * * * *

UNITED STATES PATENT AND TRADEMARK OFFICE
CERTIFICATE OF CORRECTION

PATENT NO. : 7,713,451 B2
APPLICATION NO. : 10/577350
DATED : May 11, 2010
INVENTOR(S) : Pavan et al.

It is certified that error appears in the above-identified patent and that said Letters Patent is hereby corrected as shown below:

Claim 17, column 16, lines 29-30, "di-trimethyloipropane," should read --di-trimethylolpropane,--.

Claim 18, column 16, line 35, "trimethyloipropane" should read --trimethylolpropane--.

Claim 37, column 17, line 31, "RE®" should read --RE®--.

Claim 37, column 17, line 32, "FCM®" should read --FCM®--.

Signed and Sealed this

Thirtieth Day of November, 2010

David J. Kappos
*Director of the United States Patent and Trademark Office*